Oct. 25, 1949.  C. E. HALLMARK  2,485,594
WAVEFORM COMPENSATING CIRCUIT FOR
TELEVISION FILM TRANSMITTERS

Filed April 15, 1946  2 Sheets-Sheet 1

INVENTOR
CLYDE E. HALLMARK

BY

ATTORNEY

Oct. 25, 1949.   C. E. HALLMARK   2,485,594
WAVEFORM COMPENSATING CIRCUIT FOR
TELEVISION FILM TRANSMITTERS
Filed April 15, 1946   2 Sheets-Sheet 2
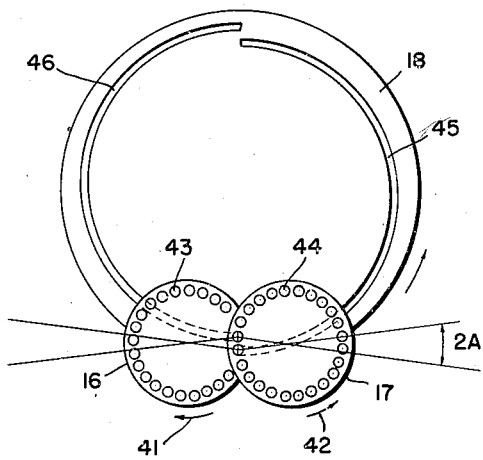
FIG. 2
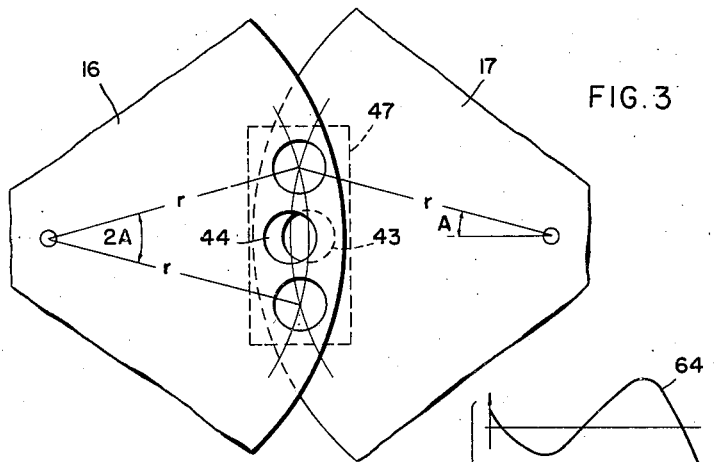
FIG. 3
FIG. 4
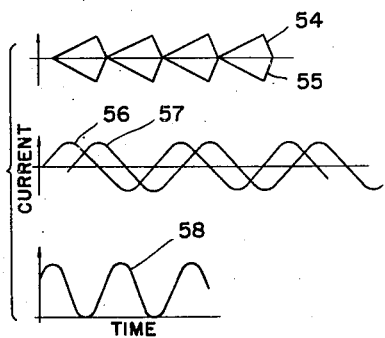
FIG. 5
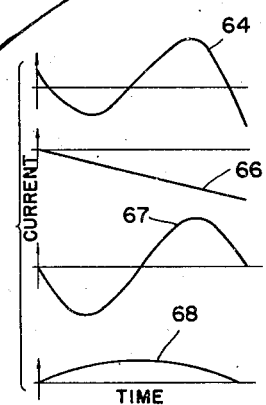
INVENTOR
CLYDE E. HALLMARK
BY
ATTORNEY Patented Oct. 25, 1949

2,485,594

UNITED STATES PATENT OFFICE 2,485,594

WAVEFORM COMPENSATING CIRCUIT FOR TELEVISION FILM TRANSMITTERS

Clyde E. Hallmark, Fort Wayne, Ind., assignor, by mesne assignments, to Farnsworth Research Corporation, a corporation of Indiana Application April 15, 1946, Serial No. 662,140

7 Claims. (Cl. 178—7.7)

This invention relates to television apparatus, and particularly to such apparatus arranged for the television transmission of motion pictures.

For telecine operation, that is, for the projection of motion picture films for television transmission, two types of conventional motion picture projectors are employed. In the conventional intermittent type of motion picture projector, the film is moved intermittently past the film gate, the film being held stationary while a frame is projected, and then being occulted by a shutter while the film is moved into position for the projection of the succeeding picture frame. The sudden stopping and rapid downward motion of the film subjects it to considerable wear and tear. Furthermore, a motion picture film usually carries a sound track in addition to the picture frames, and, therefore, the portion or loop of the film from which the sound is taken off must be carefully isolated from the intermittent motion of the rest of the film.

In view of these inherent disadvantages of intermittent film projectors, a continuous film projector appears very attractive. In a continuous film projector, the film is moved at a uniform speed past the film gate, and an optical system is provided for compensating the film movement so that the images of successive picture frames may be maintained stationary in a given plane. A large number of different optical systems has been suggested for keeping each image of a picture frame substantially stationary in the focusing plane for a predetermined interval of time. Such systems may comprise, for example, rotating or oscillating mirrors, lenses or prisms. It is usually assumed that for the small angles through which the moving optical element is operative the sine of the angle is equal to the angle, or in other words that a lens, for example, moving at a constant speed through an arcuate path will have a linear downward movement.

Due to inherent inaccuracies of the optical systems utilized for compensating the movement of a continuously moving film, the image of the film exhibits undesired motions or "jumps." These undesired motions or jumps of the images of the film seriously limit the vertical resolution which may be obtained with such a motion picture transmission system. Present television standards require interlaced scanning so that each image is scanned several times. Accordingly, an image projected on the photosensitive member of a television pick-up tube must be kept stationary within ½ scanning line or within approximately one-tenth of one percent to comply with the present television standards requiring the transmission of 525 lines per frame.

It is, therefore, very desirable to provide means for keeping the projected images of a continuously moving motion picture film sufficiently stationary to satisfy the present television standards. This would make it possible to utilize, for television transmission, continuous film projectors which up to now have not met with much success in view of the inherent jumps exhibited by the projected images.

It is an object of the present invention, therefore, to provide television apparatus for transmitting motion pictures with a degree of vertical resolution sufficient to satisfy the demands of present television standards which require interlaced scanning.

A further object of the present invention is to compensate electrically, in television apparatus for transmitting pictures of a continuously moving motion picture film, the undesired motions or jumps of the images of successive film frames projected on the photosensitive member of the pick-up tube.

In accordance with the present invention, there is provided television apparatus for transmitting pictures of a motion picture film comprising a picture signal generating tube including a photosensitive member and means for continuously moving a film across the photosensitive member. Means are provided for projecting successive images of the film on the photosensitive member and for keeping each of the images substantially stationary on the photosensitive member for a predetermined interval of time. The projecting means impart undesired motions to the images during these predetermined intervals of time. Means are provided for cyclically deflecting an electron beam in two directions and cooperating with the photosensitive member to produce a train of picture signals. Finally, means are provided for controlling the deflection of the electron beam in such a manner as to compensate for the undesired motions of the images.

For a better understanding of the invention, together with other and further objects thereof, reference is made to the following description, taken in connection with the accompanying drawings, and its scope will be pointed out in the appended claims.

In the accompanying drawings:

Fig. 2 is an elevational view on enlarged scale, taken on line 2—2 of Fig. 1 and illustrating an optical system for keeping successive images of a continuously moving film substantially stationary;

Fig. 3 is a detail view on enlarged scale of the optical system of Fig. 2;

Fig. 4 is a graph illustrating current waves developed by the electric circuits of Fig. 1; and Fig. 5 is a graph illustrating current waves which may be utilized for effecting compensation of the undesired motions of the projected images.

Figure 1:
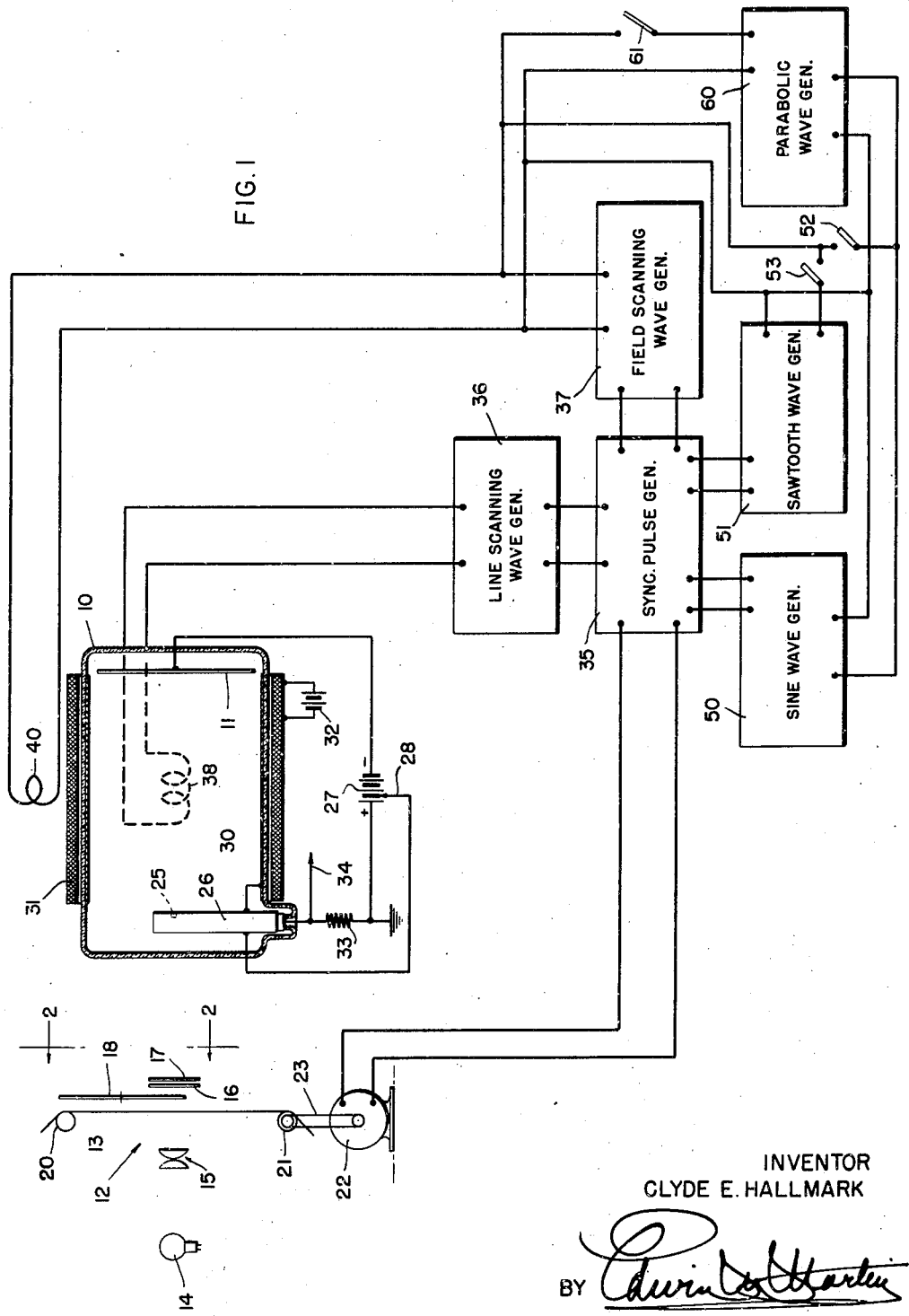
Fig. 1 illustrates a television picture signal generating tube and associated electric circuits embodying the present invention and arranged for transmitting motion pictures.

Referring to Fig. 1 of the drawings, there is illustrated image dissector tube 10 having a photosensitive cathode 11. A continuous film projector generally indicated at 12 is provided for projecting successive images of continuously moving motion picture film 13 on photosensitive cathode 11. Continuous film projector 12 is of the type described and claimed in U. S. Patents 2,323,512 and 2,323,513 to H. S. Bamford, of July 6, 1943.

The light from incandescent light source 14 is projected by lens system 15 through film 13 and focused in the plane of lens discs 16, 17 which cooperate with selector shutter 18 to provide an optical compensating system. Lens discs 16, 17, in turn, focus an image of film 13 on photosensitive cathode 11. The optical system which comprises lens discs 16, 17 and selector shutter 18 is arranged for keeping each successive image of film 13 substantially stationary on photosensitive cathode 11 for a predetermined interval of time in a manner to be explained hereinafter.

Film 13 is guided over sprocket gear 20 and drive sprocket 21 which is driven by electric motor 22 through shaft 23. Thus, film 13 is advanced at a constant speed across photosensitive member 11. Preferably, lens discs 16, 17 and selector shutter 18 are also driven by electric motor 22 in a manner explained in the Bamford patents above referred to in order to insure synchronism between the continuous movement of film 13 and the optical compensating system.

The light focused on photosensitive cathode 11 will liberate photoelectrons which are accelerated toward aperture 25 in anode finger 26. To this end, there is provided a suitable voltage source such, for example, as battery 27 having its positive terminal grounded, while its negative terminal is connected to photosensitive cathode 11. By means of tap 28, anode finger 26 is kept at a potential intermediate between ground and that of photosensitive cathode 11. Image dissector tube 10 is provided with an electrically conducting wall coating 30 which is connected to anode finger 26 for accelerating the photoelectrons toward anode finger 26.

Focusing coil 31 which may be energized by a suitable source such, for example, as battery 32 focuses the photoelectrons on aperture 25 of anode finger 26. Preferably, the photoelectrons passing through aperture 25 are multiplied by an electron multiplier, not illustrated, and the output signal may be developed across load resistor 33, connected to the collector stage of the multiplier, and obtained from terminal 34.

Electric motor 22 is preferably energized or synchronized from synchronizing pulse generator 35 which is arranged to develop synchronizing pulses at the line and field frequencies. Accordingly, line scanning wave generator 36 and field scanning wave generator 37 are synchronized by synchronizing pulse generator 35. Line scanning wave generator 36 is connected to line deflecting coils 38 while field scanning wave generator 37 is connected to field deflecting coils 40. Through the combined action of the magnetic deflecting fields developed by deflecting coils 38 and 40, the photoelectrons liberated from photosensitive cathode 11 are swept past aperture 25 horizontally in accordance with the line scanning frequency and vertically in accordance with the field scanning frequency. The vertical deflection of the photoelectrons, therefore, is in a direction parallel to the direction of movement of motion picture film 13.

The optical system including lens discs 16, 17 and selector shutter 18, which serves for keeping successive images of continuously moving film 13 substantially stationary on photosensitive cathode 11, is illustrated in detail in Figs. 2 and 3. Lens discs 16 and 17 are arranged to rotate in opposite directions as indicated by arrows 41 and 42 in Fig. 2. Each lens disc 16 and 17 has 24 lens elements 43 and 44, respectively, which together form compound lenses. These compound lenses move in an arcuate path downwards across the film gate, indicated in Fig. 3 at 47 and across photosensitive member 11. Selector shutter 18 is provided with two spiral apertures 45 and 46. Each spiral aperture 45 and 46 is arranged to expose one compound lens during its downward travel across film gate 47 until the first compound lens is occulted and simultaneously the next compound lens is exposed.

Lens discs 16, 17 rotate at 60 revolutions per minute so that in one second 24 lens elements rotate past a given point. Selector shutter 18 rotates at 720 revolutions per minute or 12 revolutions per second. Accordingly, each aperture 45 and 46 exposes one compound lens for $\frac{1}{24}$ of a second.

During its downward travel across film gate 47 each compound lens moves through an angle of 2A as indicated in Fig. 3. This angle A is 7.5 degrees for 2½–2½ television scansion and alternately 6 and 9 degrees for 2–3 television scansion. For 2½–2½ television scansion each image of a picture frame is scanned 2½ times, while for 2–3 scansion an image of a picture frame is scanned twice while the succeeding image is scanned thrice.

Each of the lens elements 43 and 44 in either disc 16 or 17 would form an image of gate 47 which would move in an arcuate path. This motion of the image may be resolved into a horizontal component and vertical component, the horizontal component being a function of cos A and the vertical component being a function of sin A. With the two lens discs 16 and 17 moving in synchronism and with opposite senses of rotation, the cosine components of these motions exactly cancel each other, whereas the sine components reinforce each other resulting in a vertical motion of each image, the motion being downward.

Actually each compound lens moves through a distance which equals 2r sin A where r is the radius of each lens disc. Since the angle A changes at a uniform speed, it will be obvious that the movement given by 2r sin A is not linear, particularly for angles as large as 6 to 9 degrees. Accordingly, the optical system comprising lens discs 16, 17 and selector shutter 18 will compensate the over-all motion of film 13, but this does not means that the motion at each instant is perfectly compensated. If the over-all motion is compensated, that is, if the adjustment is such that the image is in its mean position at the instants of exposure and occultation, and midway between these points, the displacement of the image is upward during the first half of the cycle and downward during the last half, the two displacements being equal.

If, however, the over-all motion is slightly undercompensated, the image will start in a low position, pass through its median position, rise above it and return thereto during the first half of the cycle and repeat the operation in reverse during the last half, ending in a high position. The total movement during each half cycle of the exposure will be relatively almost the same as before, but since the movement is both above and below, in each half of the cycle, the over-all displacement is cut in half.

The relative movement of the images of gate 47 and of film 13 with respect to gate 47 are affected differently by the degree of magnification $m$, being proportional to $m+1$ and $m$, respectively. Therefore, the final degree of compensation may be varied by varying the focal distance between gate or film 13 and lenses 43, 44.

It will, accordingly, be seen that the rate and type of motion of successive images of film 13 may be varied considerably with the continuous film projector illustrated in the drawings. It has already been pointed out that other continuous film projectors will also inherently impart undesired motions to the images of the film to be transmitted. In order to keep the transmitted images stationary, the deflection of the photoelectrons with respect to aperture 25 is controlled in accordance with the present invention in such a manner as to compensate for these undesired motions of the images.

To this end, electric signals are impressed on field deflecting coils 40 which are of such a character as to compensate for these undesired motions. These electric signals should have predetermined phases, frequencies, amplitudes and wave shapes.

In accordance with the present invention, there is provided sine wave generator 50 and saw-tooth wave generator 51 which are both connected to synchronizing pulse generator 35. The output of generators 50 and 51 is connected through switches 52 and 53, respectively, to field deflecting coils 40. Saw-tooth wave generator 51 and sine wave generator 50 preferably have means for adjusting the amplitude and phase of the output waves. The output current of generator 51 is shown at 54 and 55 in Fig. 4, saw-tooth wave 54 being opposite in polarity to that of wave 55. The ouput current of sine wave generator 50 is illustrated at 56 and 57 in Fig. 4 which illustrates two sine waves of equal amplitude and different phase. Preferably, sine wave generator 50 is also arranged for developing a sine wave illustrated at 58 which is a harmonic of the sine waves 56 and 57. Wave generators 50 and 51 may be similar to the shading correction generators which are required for correcting or compensating the shading signal developed when the mosaic electrode of a picture signal generating tube is scanned by a high velocity electron beam. Such shading correction generators are described on pages 414 to 418 of "Principles of Television Engineering" by Donald G. Fink, published in 1940 by McGraw-Hill Book Company, Inc., New York.

It is also feasible to develop parabolic current waves by parabolic wave generator 60 connected to sine wave generator 50 and having its output connected to field deflecting coils 40 through switch 61. Generator 60 may include a distorting amplifier or clipper through which a sine wave developed by generator 50 is passed for developing a current wave of parabolic form.

By properly mixing the waves developed by generators 50, 51 and 60 and by controlling or adjusting their phases, frequencies and amplitudes, electric signals may be developed which will compensate the undesired motions or jumps of the images of film 13. Referring now to Fig. 5, there is illustrated current wave 64 representing the electric signal required for compensating the undesired motions of the images of film 13 when the over-all motion is slightly undercompensated as explained hereinbefore. Current wave 64 which may flow through field deflecting coils 40 may be obtained by mixing or adding current waves 66, 67 and 68 of Fig. 5. Current wave 66 may be developed by saw-tooth wave generator 51 and may be identical with current wave 55 of Fig. 4. Wave 67, which is a sinusoidal wave, may be derived from sinusoidal wave generator 50 and may be identical with current wave 58 of Fig. 4. Current wave 68 is a parabolic wave which may be derived from parabolic wave generator 60. By adding waves 66 to 68, the desired compensating signal represented by current wave 64 is obtained.

In the same manner, the jumps of the film images developed by other types of continuous film projections may be compensated. In general, different signals will be required for compensating the jumps developed by different types of continuous film projectors. It is to be understood that any pick-up tube which will develop television signals representative of the film images projected by a continuous film projector may be used with the motion picture transmitter of the invention.

These jumps may be produced in slow motion by moving film 13 and optical compensating system 16, 17 and 18 slowly by hand so that the motions of an image may be plotted against time. By compensating the jumps of the images of the film in the manner described hereinabove, the vertical resolution of a television motion picture transmitter may be increased to any desired degree of accuracy.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Television apparatus for transmitting pictures of a motion picture film comprising a picture signal generating tube including a photosensitive member, means for continuously moving a film across said member, means for projecting successive images of said film on said member and for keeping each of said images substantially stationary on said member for a predetermined interval of time, said projecting means imparting undesired motions to said images during said intervals, means for cyclically deflecting an electron beam in two directions and cooperating with said member to produce a train of picture signals, and adjustable wave generating means coupled to said deflecting means for distorting the deflection of said beam in such a manner as to compensate for said undesired motions of said images, said adjustable wave generating means comprising a plurality of means for developing waves of different forms and means for impressing said waves in selected combinations on said deflecting means.

2. Television apparatus for transmitting pictures of a motion picture film comprising a picture signal generating tube including a photosensitive member, means for continuously moving a film across said member, means for projecting successive images of said film on said member and for keeping each of said images substantially stationary on said member for a predetermined interval of time, said projecting means imparting undesired motions to said images during said intervals, means for cyclically deflecting an electron beam in two directions and cooperating with said member to produce a train of picture signals, and adjustable wave generating means coupled to said deflecting means for distorting the deflection of said beam in one of said directions for compensating said undesired motions of said images, said adjustable wave generating means comprising a plurality of wave generators and means to connect said generators in various combinations to said deflecting means.

3. Television apparatus for transmitting pictures of a motion picture film comprising a picture signal generating tube including a photosensitive member, means for continuously moving a film across said member, means for projecting successive images of said film on said member and for keeping each of said images substantially stationary on said member for a predetermined interval of time, said projecting means imparting undesired motions to said images during said intervals, means for cyclically deflecting an electron beam in a first direction substantially at right angles to the direction of movement of said film and in a second direction substantially parallel to the direction of movement of said film, said beam deflecting means cooperating with said member to produce a train of picture signals, and adjustable wave generating means coupled to said deflecting means for distorting the deflection of said beam in said second direction in such a manner as to compensate for said undesired motions of said images, said adjustable wave generating means comprising a plurality of generators of different wave forms and means operable to connect the output circuits of said generators in various combinations.

4. Television apparatus for transmitting pictures of a motion picture film comprising a picture signal generating tube including a photosensitive member, means for continuously moving a film across said member, means for projecting successive images of said film on said member and for keeping each of said images substantially stationary on said member for a predetermined interval of time, said projecting means imparting undesired motions to said images during said intervals, means for cyclically deflecting an electron beam in a first direction and in a second direction including a first and a second deflecting element said beam deflecting means cooperating with said member to produce a train of picture signals, a line scanning wave generator for supplying said first element, a field scanning wave generator for supplying said second element, and adjustable wave generating means coupled to said field scanning wave generator for impressing on one of said elements electric signals of such a character as to compensate for said undesired motions of said images, said adjustable wave generating means comprising a sine wave generator, a complex wave generator, a different complex wave generator and means operable to selectively connect the output circuits of said generators in various combinations.

5. Television apparatus for transmitting pictures of a motion picture film comprising a picture signal generating tube including a photosensitive member, means for continuously moving a film across said member, means for projecting successive images of said film on said member and for keeping each of said images substantially stationary on said member for a predetermined interval of time, said projecting means imparting undesired motions to said images during said intervals, means for cyclically deflecting an electron beam in a first direction substantially at right angles to the direction of movement of said film including a first deflecting element and in a second direction substantially parallel to the direction of movement of said film including a second deflecting element, said beam deflecting means cooperating with said member to produce a train of picture signals, a line scanning wave generator for supplying said first element, a field scanning wave generator for supplying said second element, and adjustable wave generating means coupled to said field scanning wave generator for impressing on said second element predetermined electric signals of such a character as to compensate for said undesired motions of said images, said adjustable wave generating means comprising a fundamental sine wave generator, a harmonic wave generator, a different harmonic wave generator and switching means operable to selectively connect the output circuits of said generators in various combinations.

6. Television apparatus for transmitting pictures of a motion picture film comprising a picture signal generating tube including a photosensitive member, means for continuously moving a film across said member, means for projecting successive images of said film on said member and for keeping each of said images substantially stationary on said member for a predetermined interval of time, said projecting means imparting undesired motions to said images during said intervals, means for cyclically deflecting an electron beam in a first direction substantially at right angles to the direction of movement of said film and in a second direction substantially parallel to the direction of movement of said film, said beam deflecting means cooperating with said member to produce a train of picture signals and including a first and a second deflecting element, a line scanning wave generator for suplying said first element, a field scanning wave generator for supplying said second element, and adjustable wave generating means coupled to said second element for developing signals of predetermined phase, frequency, amplitude and wave shape, thereby to compensate said undesired motions of said images, said adjustable wave generating means comprising a sine wave generator, a sawtooth wave generator, a parabolic wave generator and switching means associated respectively with said generators and operable to selectively connect the output circuits of said generators in various combinations.

7. Television apparatus for transmitting pictures of a motion picture film comprising a picture signal generating tube including a photosensitive member, means for moving a film across said member at a constant speed, means for projecting successive images of said film on said member and for keeping each of said images substantially stationary on said member for a predetermined interval of time, said projecting means imparting undesired motions to said images during said intervals, means for cyclically deflecting an electron beam in a first direction substantially at right angles to the direction of movement of said film including a first deflecting element and in a second direction substantially parallel to the direction of movement of said film including a second deflecting element, said deflecting means cooperating with said member to produce a train of picture signals, a line scanning wave generator for supplying said first element, a field scanning wave generator for supplying said second element, and adjustable wave generating means coupled to said second element for developing cyclically recurring signals of predetermined phase, frequency, amplitude and wave shape, thereby to compensate said undesired motions of said images, said adjustable wave generating means comprising an individual sine wave generator, an individual saw-tooth wave generator, an individual parabolic wave generator and switches associated respectively with said individual generators and separately operable to selectively connect the output circuits of said individual generators in various combinations.

CLYDE E. HALLMARK.

REFERENCES CITED

The following references are of record in the file of this patent:

UNITED STATES PATENTS

| Number | Name | Date |
| --- | --- | --- |
| 2,227,054 | Bedford | Dec. 31, 1940 |
| 2,323,512 | Bamford | July 6, 1943 |
| 2,323,513 | Bamford | July 6, 1943 |